United States Patent [19]
Macken

[11] Patent Number: 5,128,953
[45] Date of Patent: Jul. 7, 1992

[54] TRANSMISSIVE OPTICS FOR HIGH POWER LASERS

[76] Inventor: John A. Macken, 3755 Wallace Rd., Santa Rosa, Calif. 95404

[21] Appl. No.: 701,195

[22] Filed: May 16, 1991

[51] Int. Cl.⁵ .............................................. H01S 3/22
[52] U.S. Cl. ...................................... 372/58; 372/34; 372/92; 372/55
[58] Field of Search ............... 372/58, 34, 92, 55, 372/64, 83

[56] References Cited

U.S. PATENT DOCUMENTS 5,048,051  9/1991  Zayhowski .................. 372/34

Primary Examiner—Leon Scott, Jr.
Attorney, Agent, or Firm—Larry D. Johnson

[57] ABSTRACT

Transmissive optics such as lenses, windows, and output couplers can be improved by positioning two transmissive optical elements to form a thin channel between them. High pressure gas flows through this channel to face cool the optics.

6 Claims, 1 Drawing Sheet

TRANSMISSIVE OPTICS FOR HIGH POWER LASERS

BACKGROUND OF THE INVENTION

The background of the invention will be discussed in two parts:

1. Field of the Invention

This invention relates to both optics and lasers. More particularly, it relates to a method and apparatus for improving the maximum power which can be transmitted through transmissive optics.

2. Description of the Prior Art $CO_2$ lasers in particular and other high power lasers in general have had a problem with transmissive optics at high power levels. When high power laser beams are passed through transparent materials, there is a limit to the power that can be transmitted without causing either a distortion to the transmitted laser beam or else a destruction of the transparent optics. In some cases, this limit is associated with a high power density causing a fundamental change in the optical material such that the absorption of the material increases. That type of limit associated with power density is rare and is not addressed here. The most common type of problem encountered in passing high power laser beams through transparent materials is non uniform heating of the transparent material. This, in turn, results in a build up of stresses in the material which can both distort the laser beam and also cause the transparent material to fracture. When a material experiences this type of limit, a particular material can have a figure of merit which relates to the total power handling capability of that material. For example, zinc selenide (a transparent material for use with high power $CO_2$ lasers) typically approaches a thermal limit when the power transmitted through the zinc selenide exceeds 2500 watts. This number depends on various factors including the coatings that are on the material and the distribution of the laser beam. For example, a lens used with a high power $CO_2$ laser will typically have the heat removed by radial thermal conduction to a heat sink around the edge of the lens. In this case, a metal ring may make good thermal contact with the edge of the lens using an indium bond for thermal conduction. In some cases, air is also blown on the surface of the lens to produce a small amount of face cooling. The primary heat removal path is through the edge of the lens, yet the laser beam primarily passes through the center of the lens. Therefore, there is heating of the lens near the center resulting in a hoop stress built up in the lens because of the temperature profile described. This hoop stress can result either in a distortion of the lens or else in the extreme case, fracturing of the lens.

Laser metal working equipment, for example, can be quite expensive. Most of the cost is associated not with the laser but instead with the other mechanical and electronic components required to direct the laser to the proper location. The productivity of the entire piece of equipment is limited by the cutting speed of the laser. The maximum practical laser power, in turn, is limited by the power which can be transmitted through the lens. This is to say that most of these laser cutting machines are limited to about 2500 watts because this is the limit of the power handling capability of the lens. (Focusing mirrors can be used but the lens is more desirable because the lens also serves as a barrier for gas jet assisted cutting.) If it were possible to increase the power handling capability of the lens, then more powerful lasers could be used and the production rate of the entire machine could be increased. The invention described herein relates to a new design for transmissive optics used with high power lasers, such as lenses, windows, and output couplers. The description which follows will use as an example a lens system made of zinc selenide and used with a high power $CO_2$ laser. However, it is to be understood that the invention described herein relates to windows and output couplers as well as other materials and lasers.

SUMMARY OF THE INVENTION

Transmissive optics for high power lasers (such as lenses, windows, and output couplers) can handle much higher transmitted laser power if all of the heat is removed by cooling one face of the optics. To accomplish this, two optical components are placed close to each other so that a narrow gap forms between the two optical components. In the preferred embodiment high pressure helium is forced to flow through this gap then is re-circulated through a pump and heat exchanger. This method of heat removal is so effective that thermal stresses are greatly reduced and the pair of optics can transmit more power than was previously possible with a single optical element of a conventional design.

DESCRIPTION OF THE PREFERRED EMBODIMENTS

Figure 1:
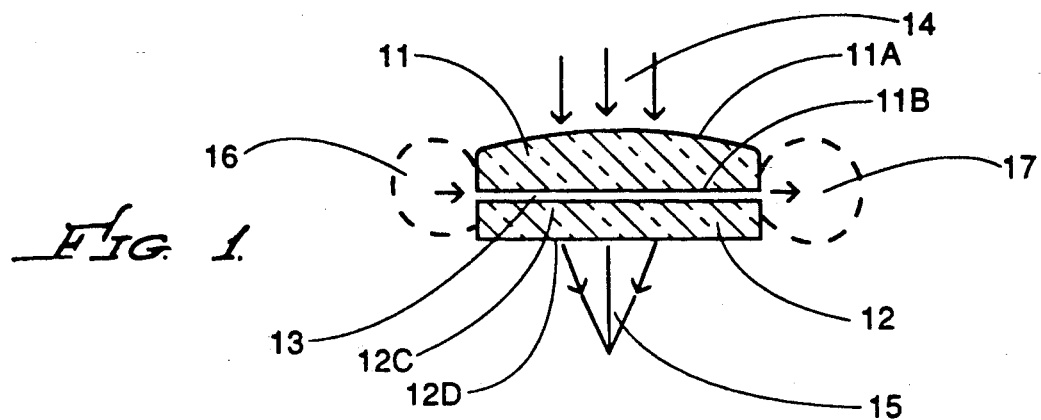
FIG. 1 is a side view of two optical components showing the general concept.

If it is possible to cool the face of an transparent optical component in a way that has very good heat removal characteristics, then the hoop stress and other thermal stresses previously described can be greatly reduced. Simply blowing air on the surface of a transmissive optics is not adequate to provide the type of heat removal required. FIG. 1 shows the general concept for the high power transmissive optics. In this case, depicted in FIG. 1, it is illustrated to show a lens system. Component 11 is shown as a plano-convex lens. Component 12 is shown as a plano-plano window. In the preferred embodiment, all the optical surfaces would be anti-reflection coated as is well known in the art. A narrow gap, 13, is left between the two optical components, 11 and 12. In operation, laser beam 14, passes through these optical components and in the case of a lens, forms a converging beam, 15.

When the laser beam passes through 11 and 12, the first surface encountered by the beam is designated 11A. The second, third, and fourth surfaces encountered are designated 11B, 12C, and 12D respectively.

In this conceptual illustration, there is a means for inducing high pressure gas (usually helium) to flow rapidly through gap 13. To accomplish this, there is some form of chamber, 16, which is pressurized with helium and another chamber, 17, which collects the helium. Not shown is that the helium flows in a closed loop through a pump and heat exchanger thereby passing from chamber, 17, back to chamber, 16.

Figure 2:
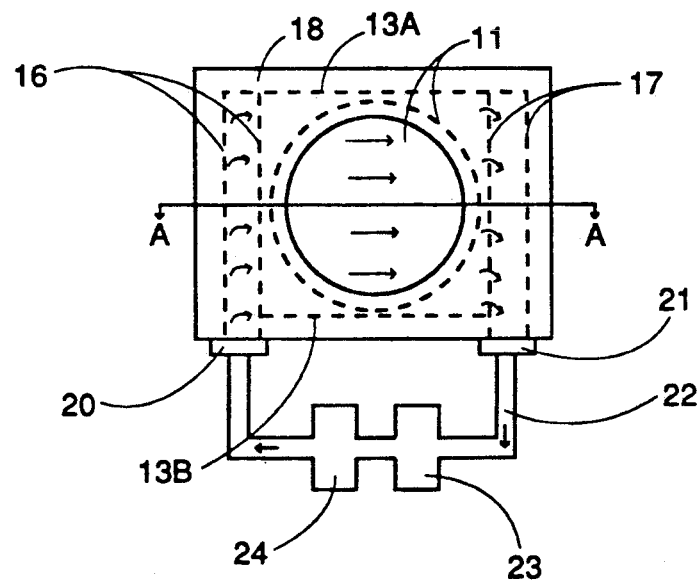
FIG. 2 is a top view of a particular embodiment of the high power transmissive optical system.
Figure 3:
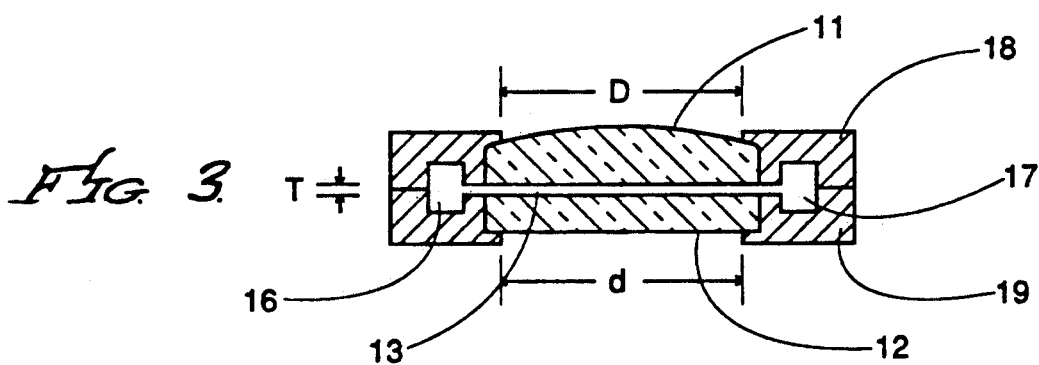
FIG. 3 is a cross section view A—A of the particular embodiment shown in FIG. 2.

FIG. 2 shows a particular embodiment of the general concept shown in FIG. 1. It is to be understood that those skilled in the art can design many variations for the mechanical holders and construction techniques used to accomplish the objectives. Therefore, FIG. 2 illustrates just one such embodiment and this particular approach is not intended to be a limitation. If FIG. 2 and 3 are taken together (3 is cross section A—A of FIG. 2), then lens 11 is visible in both FIG. 2 and 3. Window 12 is only visible in FIG. 3. Gap 13 and chambers 16 and 17 are visible in FIG. 3. These chambers, 16 and 17, are formed by metal pieces 18 and 19. In FIG. 2, 13A and 13B designate the edges of the channel, which includes gap 13 and connects chambers 16 and 17. Gas tight connections, 20 and 21, are shown in FIG. 2. Tubing, 22, is connected to chamber 17. Gas flows through tubing 22 then through pump 23 and through heat exchanger 24 to another connector 20 and then into chamber 16. The gas flow pattern can be seen from the arrows used in FIG. 2. FIG. 3 also shows that the dimension of the optical aperture for 11 and 12 is designated D and d respectively. The separation distance for the gap 13 is designated as "T" in FIG. 3. It is desirable that "T" be much smaller than either D or d (at least a factor of 5).

The concept presented here at first may seem counter productive. For example, there is a certain amount of heat which is generated in any single optical component. In the prior art, only one lens would have been used. In this device, two components, a lens and a window, are used thereby doubling the number of optical elements and doubling the heat that must be removed. However, by forming a narrow gap which can be used for heat removal, the two optical components can handle more laser power than a single optical component using the prior art approach.

An important part of the heat removal process requires that very high heat removal rates can be achieved from the cooled surface. It is not possible to use a liquid such as water for the heat removal, there are no highly transparent liquids which transmit the $CO_2$ laser wavelength. Most gases show such low thermal conductivity and heat removal rates, that they are not adequate to accomplish the job. Only the high thermal conductivity gases consisting of helium or hydrogen are suitable for best performance. Because of the hazard of using hydrogen, the preferred material is helium. Helium has a thermal conductivity of 0.0016 watts/cm °K. This thermal conductivity is comparable to that of the acetone or ethyl alcohol. However, it is not necessary to use pure helium. Mixing helium with some less expensive gas such as nitrogen or argon can still result in very high thermal conductivity compared to air. For example, air, nitrogen, and oxygen all have thermal conductivities of 0.00026 watts/cm °K. at 300° K. The addition of helium or hydrogen can raise this conductivity dramatically even at relatively low percentages of helium or hydrogen. For purposes of this discussion, a high thermal conductivity gas will be defined as a gas with a conductivity greater than 0.0004 watts/cm °K. at 300° K.

However, in convective cooling, it is necessary not only to have a high thermal conductive gas but also to have sufficient heat capacity in the gas and sufficient flow velocity to be able to remove the heat. To increase the heat capacity, it is desirable to use the helium (or other gas) at pressures in excess of 2 atmospheres. In addition, the pressure differential between chambers 16 and 17 in FIG. 1 should be sufficient to obtain a high flow rate. As an illustration, if lens 11 and window 12 are both 3.5 cm in diameter, and the gap 13 in FIG. 1 is 0.08 mm, the pressure in chamber 16 of helium is 10 atmospheres and the pressure in chamber 17 is sufficiently lower to cause the helium to flow through gap 13 with a velocity of 100 meters per second, then the heat removal rates are high enough that face cooling dominates the heat removal. In fact, another consideration is that the heat removal rates with the high velocity high pressure helium are so great that there is not significant radial heat transfer from the central region of the lens which is being heated by the laser beam to areas of the lens near the edge which are not being heated by the laser beam. Since these edge areas are also being cooled, it would be possible to still create some hoop stress in the lens if the major flow of the heat was first of all to distribute the heat throughout the entire volume of the lens then to remove the heat from the face. In this example, it should be pointed out that there is no attempt to remove the heat from the edge of the lens through thermal conduction to the housing 18 and 19 in FIG. 2. In fact, the preferred embodiment, there may even be some slight thermal barrier such as silicon rubber sealant which also serves the purpose of reducing heat flow between lens 11 and housing 18 or window 12 and housing 19. This thermal barrier is not shown but would be a thin layer between the components described.

Helium has a thermal conductivity approximately 6 times greater than air. In some applications, it would be possible to substitute high pressure high velocity air for the helium and in this case, it would not be necessary to use a closed loop path. This is to say that the air which has blown between the two lenses could be used to assist the cutting as is well known to those skilled in the art in laser cutting. However, a factor of 6 places the use of helium in an entirely different category than the use of air when it comes to heat removal. Also, helium has an index refraction which is 8 times less than air when subtracted from 1 (the index of refraction for a vacuum). This low index of refraction minimizes thermal distortion which could conceivably become a problem with heated turbulent air under high pressure.

Because of the expense of helium, it is very desirable to have a closed loop system. The specifications for pump 23 and heat exchanger 24 shown in FIG. 2 can be determined by those skilled in the art. The pumping capacity of 23 and the heat removal rates of heat exchanger 24 can be calculated.

In the preferred embodiments, the pressure of the helium gas would be between 2 and 30 atmospheres. Also, the preferred embodiment has a fairly uniform flow pattern as illustrated in FIG. 2. However, it should be understood that in some cases, it may be desirable to have a flow pattern which concentrates a higher velocity flow across the center of the lens. This could possibly be of some benefit for laser beams which have a concentration of their power in the center of the beam.

Although there has been shown and described the preferred the embodiment, it is to be understood that other modifications may be made without departing from the spirit and scope of the invention.

I claim:

1. An optical device used to transmit a high power laser beam, the improved feature comprising:
   first and second transparent optical elements said first optical element having first and second optical surfaces said second optical element having optical surfaces designated third and fourth optical surfaces said first optical element has a clear aperture with a transverse dimension D said second optical element has a clear aperture with a transverse dimension d said first and second optical elements positioned such that said second optical surface and said third optical surface are separated by a predetermined distance T thereby forming a channel between said first and second optical elements said predetermined distance T is small compared to both said dimensions D and d said optical device also has first and second chambers which are generally positioned on opposite sides of said channel formed by said second and third optical surfaces said first chamber is pressurized with a gas at a predetermined pressure P1 said second chamber is at a pressure P2 said pressure P1 is substantially greater than said pressure P2 such that said gas rapidly flows in said channel formed by said second and third optical surfaces said laser beam is transmitted through said first and second optical element thereby resulting in heat being deposited in said first and second optical elements said rapidly flowing gas cools said second and third optical surfaces thereby providing the primary source of heat removal from said first and second optical elements.

2. The apparatus according to claim 1 wherein said gas is a high thermal conductivity gas chosen from the group of gases consisting of helium, hydrogen and gas mixtures containing sufficient helium or hydrogen to achieve a thermal conductivity greater than 0.004 watts/cm °K. at 300° K.

3. The combination according to claim 2 whereby said first and second chambers are connected together by an enclosed gas circulation channel which includes a pump and a heat exchanger means such that said gas leaving said second chamber is pumped and cooled before reentering said first chamber.

4. The combination according to claim 3 whereby said pressure P1 is greater than 5 atmospheres.

5. The apparatus according to claim 1 whereby said pressure P1 is greater than 2 atmospheres.

6. The combination according to claim 5 where said dimensions D and d are more than 5 times greater than said dimension T.

* * * * *